US008659183B2

(12) United States Patent      (10) Patent No.: US 8,659,183 B2
Crist et al.      (45) Date of Patent: Feb. 25, 2014

(54) VARIABLE INITIALIZATION TIME IN THE CHARGING OF ENERGY RESERVES IN AN IRRIGATION CONTROL SYSTEM

(75) Inventors: Timothy J. Crist, Tucson, AZ (US); Kenneth J. Dietz, Vail, AZ (US)

(73) Assignee: Rain Bird Corporation, Azusa, CA (US)

( * ) Notice: Subject to any disclaimer, the term of this patent is extended or adjusted under 35 U.S.C. 154(b) by 1084 days.

(21) Appl. No.: 12/505,397

(22) Filed: Jul. 17, 2009

(65) Prior Publication Data

US 2011/0015793 A1    Jan. 20, 2011

(51) Int. Cl.
     *H02J 3/14*      (2006.01)
(52) U.S. Cl.
     USPC ............... 307/38; 700/284; 700/296; 702/85; 340/514
(58) Field of Classification Search
     USPC .......................................................... 307/38
     See application file for complete search history.

(56) References Cited

U.S. PATENT DOCUMENTS

| | | |
|---|---|---|
| 3,547,154 A | 12/1970 | Benham |
| 3,729,710 A | 4/1973 | Sherwin |
| 3,747,620 A | 7/1973 | Kah |
| 3,941,348 A | 3/1976 | Mott |
| 3,989,066 A | 11/1976 | Sturman |
| 4,007,458 A | 2/1977 | Hollabaugh |
| 4,022,244 A | 5/1977 | Oman |
| D246,377 S | 11/1977 | Pansini |
| 4,121,114 A | 10/1978 | Ruggles |
| 4,131,882 A | 12/1978 | Hollabaugh |
| 4,165,532 A | 8/1979 | Kendall |
| 4,176,395 A | 11/1979 | Evelyn-Veere |
| 4,241,375 A | 12/1980 | Ruggles |
| 4,423,484 A | 12/1983 | Hamilton |
| 4,535,401 A | 8/1985 | Penn |
| 4,548,225 A | 10/1985 | Busalacchi |

(Continued)

FOREIGN PATENT DOCUMENTS

| | | |
|---|---|---|
| EP | 0748584 A1 | 12/1996 |
| EP | 1324166 A2 | 7/2003 |

(Continued)

OTHER PUBLICATIONS

Michrochip Technology Inc.; *PIC/16F631/677/685/687,689/690 Data Sheet;* 20-Pin Flash-Based, 8-Bit CMOS Microcontollers with Nano Watt Technology; 2006; 294 pages.

(Continued)

*Primary Examiner* — Rexford Barnie
*Assistant Examiner* — Toan Vu
(74) *Attorney, Agent, or Firm* — Fitch, Even, Tabin & Flannery, LLP

(57) ABSTRACT

Methods for controlling irrigation devices coupled to and receiving operational power from a multi-wire interface of an irrigation system, and related irrigation devices, are provided. In some forms, the methods define initialization of the irrigation devices having received operational power, including the timing of charging, discharging and recharging of the irrigation devices in order to provide a time staggered recharging of the energy reserves of the irrigation devices. In some forms, the methods involve the use of different delay periods at different irrigation devices coupled to irrigation valves to place multiple irrigation valves into a known position. In some embodiments, these methods spread out the usage of charging energy drawn from the multi-wire interface by the irrigation devices coupled thereto to reduce inrush currents.

39 Claims, 6 Drawing Sheets

(56) References Cited

U.S. PATENT DOCUMENTS

| | | |
|---|---|---|
| 4,562,506 A | 12/1985 | Moran |
| 4,596,266 A | 6/1986 | Kinghorn |
| 4,645,882 A | 2/1987 | Nakayama |
| 4,716,490 A | 12/1987 | Alexanian |
| 4,718,454 A | 1/1988 | Appleby |
| D294,964 S | 3/1988 | Mendenhall |
| D297,929 S | 10/1988 | Hughes |
| 4,777,556 A | 10/1988 | Imran |
| 4,811,221 A | 3/1989 | Sturman |
| 5,021,939 A | 6/1991 | Pulgiese |
| 5,048,755 A | 9/1991 | Dodds |
| 5,079,667 A | 1/1992 | Kasano |
| 5,100,056 A | 3/1992 | Theodorsen |
| 5,229,649 A | 7/1993 | Nielsen |
| 5,251,153 A | 10/1993 | Nielsen |
| 5,333,785 A | 8/1994 | Dodds |
| 5,347,421 A | 9/1994 | Alexanian |
| 5,402,303 A | 3/1995 | Luck |
| D361,057 S | 8/1995 | Fayfield |
| 5,485,400 A | 1/1996 | Warrior |
| 5,638,847 A | 6/1997 | Hoch, Jr. |
| 5,649,818 A | 7/1997 | Day |
| 5,655,561 A | 8/1997 | Wendel |
| 5,661,349 A | 8/1997 | Luck |
| 5,740,031 A | 4/1998 | Gagnon |
| 5,760,706 A | 6/1998 | Kiss |
| 5,780,938 A | 7/1998 | Edwards |
| 5,825,664 A | 10/1998 | Warrior |
| 5,826,619 A | 10/1998 | Roman |
| 5,839,658 A | 11/1998 | Sarver |
| 5,848,609 A | 12/1998 | Marchesseault |
| 5,914,847 A | 6/1999 | Alexanian |
| 5,938,172 A | 8/1999 | Ohtsuka |
| 6,021,038 A | 2/2000 | Hanchett, Jr. |
| 6,126,141 A | 10/2000 | Geiger |
| 6,154,354 A | 11/2000 | Alexanian |
| 6,283,139 B1 | 9/2001 | Symonds |
| 6,335,855 B1 | 1/2002 | Alexanian |
| 6,337,635 B1 | 1/2002 | Ericksen |
| 6,351,366 B1 | 2/2002 | Alexanian |
| 6,378,838 B1 | 4/2002 | Brundisini |
| 6,460,563 B2 | 10/2002 | Olson |
| D470,823 S | 2/2003 | Ufer |
| D477,287 S | 7/2003 | Roman |
| 6,652,188 B1 | 11/2003 | Albright |
| 6,694,223 B1 | 2/2004 | Goldberg |
| 6,721,630 B1 | 4/2004 | Woytowitz |
| 6,763,287 B2 | 7/2004 | Brundisini |
| 6,766,221 B1 | 7/2004 | Christiansen |
| 6,782,310 B2 | 8/2004 | Bailey |
| 6,782,311 B2 | 8/2004 | Barlow |
| 6,783,287 B2 | 8/2004 | Kudo |
| 6,812,826 B2 | 11/2004 | Buhler |
| 6,842,667 B2 | 1/2005 | Beutler |
| 6,898,467 B1 | 5/2005 | Smith |
| 6,948,697 B2 | 9/2005 | Herbert |
| 6,971,684 B2 | 12/2005 | Ferrari |
| 6,993,416 B2 | 1/2006 | Christiansen |
| 7,058,479 B2 | 6/2006 | Miller |
| 7,069,115 B1 | 6/2006 | Woytowitz |
| 7,084,741 B2 | 8/2006 | Plummer |
| 7,123,993 B1 | 10/2006 | Freeman |
| 7,146,225 B2 | 12/2006 | Guenst |
| 7,146,255 B2 | 12/2006 | Christiansen |
| 7,181,319 B1 | 2/2007 | Woytowtiz |
| 7,182,272 B1 | 2/2007 | Marian |
| 7,206,669 B2 | 4/2007 | Christiansen |
| D542,682 S | 5/2007 | Waki |
| 7,245,991 B1 | 7/2007 | Woytowitz |
| 7,248,945 B2 | 7/2007 | Woytowitz |
| 7,257,465 B2 | 8/2007 | Perez |
| 7,273,206 B2 | 9/2007 | Sato |
| 7,286,904 B2 | 10/2007 | Graham |
| 7,289,862 B2 | 10/2007 | Britton |
| 7,358,626 B2 | 4/2008 | Gardner |
| 7,359,769 B2 | 4/2008 | Bailey |
| 7,383,721 B2 | 6/2008 | Parsons |
| 7,398,139 B1 | 7/2008 | Woytowitz |
| 7,403,840 B2 | 7/2008 | Moore |
| 7,406,363 B2 | 7/2008 | Doering |
| 7,421,317 B2 | 9/2008 | Christiansen |
| 7,444,207 B2 | 10/2008 | Nickerson |
| 7,458,521 B2 | 12/2008 | Ivans |
| 7,474,024 B2 | 1/2009 | Nakanishi |
| 7,526,365 B1 | 4/2009 | Frerich |
| 7,574,285 B2 | 8/2009 | Kah |
| 7,613,547 B1 | 11/2009 | Woytowitz |
| 7,640,079 B2 | 12/2009 | Nickerson |
| D611,001 S | 3/2010 | Ihde |
| D622,226 S | 8/2010 | Crist |
| 7,772,726 B1 | 8/2010 | Porter |
| 7,826,931 B2 | 11/2010 | Lorenz |
| 7,883,027 B2 | 2/2011 | Fekete |
| 7,930,069 B2 | 4/2011 | Savelle |
| 7,953,517 B1 | 5/2011 | Porter |
| 8,024,075 B2 | 9/2011 | Fekete |
| 8,108,078 B2 | 1/2012 | Lorenz |
| 8,160,750 B2 | 4/2012 | Weiler |
| 8,200,368 B2 | 6/2012 | Nickerson |
| 8,224,493 B2 | 7/2012 | Walker |
| 8,260,465 B2 | 9/2012 | Crist |
| 8,274,171 B2 | 9/2012 | Korol |
| 8,295,985 B2 | 10/2012 | Crist |
| 2002/0035414 A1 | 3/2002 | Morikawa |
| 2002/0053970 A1 | 5/2002 | Plummer |
| 2002/0071234 A1 | 6/2002 | Alexanian |
| 2002/0085333 A1 | 7/2002 | Alexanian |
| 2002/0088875 A1 | 7/2002 | Sirkin |
| 2002/0091452 A1 | 7/2002 | Addink |
| 2002/0166986 A1 | 11/2002 | Remby |
| 2003/0006882 A1 | 1/2003 | Buhler |
| 2003/0120393 A1 | 6/2003 | Bailey |
| 2003/0135286 A1 | 7/2003 | Brundisini |
| 2003/0179102 A1 | 9/2003 | Barnes |
| 2003/0201675 A1 | 10/2003 | Alexanian |
| 2004/0039489 A1 | 2/2004 | Moore |
| 2004/0046137 A1 | 3/2004 | Herbert |
| 2004/0086053 A1 | 5/2004 | Anderson |
| 2004/0225412 A1 | 11/2004 | Alexanian |
| 2005/0004715 A1 | 1/2005 | Christiansen |
| 2005/0038529 A1 | 2/2005 | Perez |
| 2005/0055106 A1 | 3/2005 | Beutler |
| 2005/0087620 A1 | 4/2005 | Bowers |
| 2005/0156067 A1 | 7/2005 | Ivans |
| 2005/0156068 A1 | 7/2005 | Ivans |
| 2005/0264973 A1 | 12/2005 | Gardner |
| 2005/0273205 A1 | 12/2005 | Nickerson |
| 2006/0043208 A1 | 3/2006 | Graham |
| 2006/0080003 A1 | 4/2006 | Christiansen |
| 2006/0091245 A1 | 5/2006 | Ivans |
| 2006/0116793 A1 | 6/2006 | Christiansen |
| 2006/0206239 A1 | 9/2006 | Christiansen |
| 2007/0035907 A1 | 2/2007 | Doering |
| 2007/0106426 A1 | 5/2007 | Ensworth |
| 2007/0179674 A1 | 8/2007 | Ensworth |
| 2007/0221750 A1 | 9/2007 | Roberts |
| 2007/0282486 A1 | 12/2007 | Walker |
| 2008/0027587 A1 | 1/2008 | Nickerson |
| 2008/0039978 A1 | 2/2008 | Graham |
| 2008/0058995 A1 | 3/2008 | Holindrake |
| 2008/0157995 A1* | 7/2008 | Crist ..................... 340/825.2 |
| 2008/0211307 A1 | 9/2008 | Gardner |
| 2008/0275595 A1 | 11/2008 | Bailey |
| 2008/0288117 A1 | 11/2008 | Nickerson |
| 2008/0319585 A1 | 12/2008 | Nickerson |
| 2009/0076659 A1 | 3/2009 | Ensworth et al. |
| 2009/0076660 A1 | 3/2009 | Goldberg |
| 2009/0120521 A1 | 5/2009 | Clark |
| 2009/0138131 A1 | 5/2009 | Uy |
| 2009/0150001 A1 | 6/2009 | Fekete |
| 2009/0150002 A1 | 6/2009 | Fekete |
| 2009/0222140 A1 | 9/2009 | Christiansen |
| 2010/0004789 A1 | 1/2010 | Savelle |
| 2010/0030476 A1 | 2/2010 | Woytowitz |

(56) References Cited

U.S. PATENT DOCUMENTS

| | | |
|---|---|---|
| 2010/0082169 A1 | 4/2010 | Crist et al. |
| 2010/0094472 A1 | 4/2010 | Woytowitz |
| 2010/0145530 A1 | 6/2010 | Nickerson |
| 2010/0161144 A1 | 6/2010 | Crist et al. |
| 2011/0015794 A1 | 1/2011 | Lorenz |
| 2011/0015800 A1 | 1/2011 | Crist et al. |
| 2011/0017845 A1 | 1/2011 | Crist et al. |
| 2012/0085950 A1 | 4/2012 | Lorenz |
| 2012/0203383 A1 | 8/2012 | Holindrake |
| 2012/0303169 A1 | 11/2012 | Crist |

FOREIGN PATENT DOCUMENTS

| | | |
|---|---|---|
| EP | 1763990 A2 | 3/2007 |
| GB | 2177582 | 1/1987 |
| WO | WO 86/06579 A1 | 11/1986 |
| WO | WO 02/058254 A1 | 7/2002 |
| WO | WO 2005/002321 A2 | 1/2005 |
| WO | WO 2011/017059 A2 | 2/2011 |

OTHER PUBLICATIONS

Rain Bird, "FD Field Decoders: Rain Bird Decoders", Feb. 17, 2005, pp. 1-4, printed from www.rainbird.com/golf/products/centralcontrol/decoders.htm, Rain Bird Corporation, Glendora, CA.

Rain Bird, "Full/Part Circle Roters", Oct. 2004, pp. 1-4, Catalog No. 438, Rain Bird Corporation, Glendora, CA.

Rain Bird, "Tech Specs: Rain Bird Decoders", Oct. 2004, Rain Bird Corporation Golf Division, Tucson, AZ. (2 pages).

The Toro Company; "Golf Decoder Control System (GDC)"; Jun. 25, 2007, pp. 1-3, printed from http://web.archive.org/web/20070625035525/www.toro.com/irrigation/golf/lgturffield/gdc/index.html, The Toro Company, Bloomington, MN.

Rain Bird, "Master Parts Book 2008-2009", Jan. 2008, pp. 129-130, 140, Rain Bird Corporation, Parts and Service Center, Azusa, CA.

Rain Bird, "Maxicom2 Decoders: Sensor-Pulse", Sep. 2002, pp. 1-2, Rain Bird Corporation, Azusa, CA.

Rain Bird, "Rain Bird Latching Solenoid: Part No. 231831", 1999, Rain Bird Corporation, Tucson, AZ.

Rain Bird, "Rain Bird MDC Decoder-based Control System", Jan. 2006, pp. 1-4, Rain Bird Corporation, Azusa, CA.

\* cited by examiner

VARIABLE INITIALIZATION TIME IN THE CHARGING OF ENERGY RESERVES IN AN IRRIGATION CONTROL SYSTEM

BACKGROUND OF THE INVENTION

1. Field of the Invention

The present invention relates generally to irrigation devices, and more particularly to controlling the charging of an energy reserve of an irrigation device.

2. Discussion of the Related Art

Typical irrigation control systems cooperate with water valves and pumps to control the flow of irrigation water through a variety of water dispensing devices, including sprinklers, rotors, drip-lines, and other water delivery devices. These control systems are used in a wide variety of irrigation applications, from residential and commercial landscapes to golf course and agricultural irrigation. Rotors, for example, irrigate by throwing a jet or spray of water that is rotated about a generally vertical axis. Rotors are supplied with water from water supply lines that are usually installed below ground and are typically actuated by electric solenoid-controlled valves powered by an energy reserve.

A two-wire irrigation control system allows for the control of many remote devices each coupled at different locations in the field to a single two-wire transmission line called a two-wire interface extending through the field. An interface controller transmits alternating power signals, such as 50/60 Hz AC voltage signals, along the two-wire interface. The interface controller also modulates data on the alternating power signal, for example, by selectively clipping the positive half of the power signal. The remote devices derive their operational power from the received signaling and demodulate the data from the power signal. In this way, the interface controller can address one or more remote devices and send irrigation commands thereto. Such systems allow for the control of tens to hundreds of remote devices coupled to the single two-wire interface and are well known in the art and described, for example in U.S. Pat. No. 4,176,395 to Evelyn-Veere. A typical remote device controls the operation of a water flow control valve. A system initialization operation is commonly performed after installing irrigation devices or as part of system or ongoing, periodic field maintenance operations. During this initialization process, a large number of remote irrigation devices will undergo power-up within a short period of time. Powering-up the remote irrigation devices typically requires charging their respective energy reserves in order to power the microcontroller of the remote irrigation device and for powering an associated solenoid (e.g., to open and/or close a water flow control valve). In commercial applications, for example, the initialization process results in the powering-up of a relatively large number of remote irrigation devices, in some cases, from 20-800 remote irrigation devices. If all of the remote irrigation devices are powered-up at or about the same time, the in-rush current causes a power spike at the interface controller providing the necessary current.

SUMMARY OF THE INVENTION

In one embodiment, the invention can be characterized as a method for controlling an irrigation device coupled to and receiving operational power from a multi-wire interface of an irrigation control system, the method comprising: receiving operational power at the irrigation device as part of an operation during which the irrigation device is one of a plurality of irrigation devices receiving the operational power substantially simultaneously; charging an energy reserve of the irrigation device using the operational power, wherein the energy reserve of each of the plurality of irrigation devices is charged and adapted to supply power to an actuator coupled to an irrigation valve; identifying a delay period for the irrigation device, wherein the delay period is different than a delay period of at least one other irrigation device of the plurality of irrigation devices, and wherein the delay period defines a period of time that the irrigation device is to delay before the energy reserve is discharged; discharging the energy reserve after the delay period lapses; and recharging the energy reserve by drawing current from the multi-wire interface to provide a time staggered recharging of the energy reserves of the plurality of the irrigation devices.

In another embodiment, the invention can be characterized as an irrigation device to be coupled to and receive operational power from a multi-wire interface of an irrigation control system, the irrigation device comprising: an actuator configured to control water flow to at least one water delivery device; an energy reserve coupled to the actuator and configured to receive and be charged by operational power as part of an operation during which the irrigation device is one of a plurality of irrigation devices receiving and being charged by the operational power substantially simultaneously; and a controller. The controller is configured to: identify a delay period for the irrigation device once the energy reserve is charged, wherein the delay period is different than a delay period of at least one other irrigation device of the plurality of irrigation devices, wherein the delay period defines a period of time that the irrigation device is to delay before causing the discharging of the energy reserve; cause the energy reserve to be discharged after the delay period lapses, the discharge configured to supply power to the actuator; and cause the energy reserve to be recharged by drawing current from the multi-wire interface to provide a time staggered recharging of the energy devices of the plurality of the irrigation devices.

In a further embodiment, the invention can be characterized as a method for initializing a plurality of irrigation devices each coupled to and receiving operational power from a multi-wire interface of an irrigation control system, the method comprising: receiving initial operational power at each of the plurality of irrigation devices substantially simultaneously; charging an energy reserve of each of the plurality of irrigation devices using the received operational power, wherein the energy reserve of each of the plurality of irrigation devices is charged and adapted to supply power to a respective actuator coupled to a respective irrigation valve; identifying, by a controller at each of the plurality of irrigation devices, a delay period, wherein the delay period is different than a delay period of at least one other of the plurality of irrigation devices, and wherein the delay period defines a period of time that the irrigation device is to delay before the energy reserve is discharged; discharging the energy reserve of each of the plurality of irrigation devices after the delay period lapses; and recharging the energy reserve of each of the plurality of irrigation devices by drawing current from the multi-wire interface to provide a time staggered recharging of the energy reserves across the plurality of the irrigation devices.

In another embodiment, the invention can be characterized as a method for initializing a plurality of irrigation devices each coupled to and receiving operational power from a multi-wire interface of an irrigation control system, the method comprising: receiving initial operational power at each of the plurality of irrigation devices substantially simultaneously; powering up each of the plurality of irrigation devices using the received operational power substantially simultaneously; identifying a delay period for each of the plurality of irrigation devices, wherein the delay period for at least one irrigation device is different than the delay period for a least another irrigation device; controllably discharging and recharging an energy reserve of each of the plurality of irrigation devices after the delay period lapses at each of the plurality of irrigation devices to provide a time staggered recharging of the energy reserves across the plurality of the irrigation devices.

In another embodiment, the invention can be characterized as a method for use in controlling an irrigation device coupled to and receiving power from a multi-wire interface of an irrigation control system, the method comprising: receiving the power at the irrigation device from the multi-wire interface as part of an operation during which the irrigation device is one of a plurality of irrigation devices receiving the power from the multi-wire interface substantially simultaneously; powering up a controller of the irrigation device using the power; and outputting a control signal, after a delay period, to position an irrigation valve coupled to the irrigation device to a known position, as part of an operation during which irrigation valves coupled to the plurality of irrigation devices are also positioned to the known position after a respective delay period, wherein the delay period is different than the respective delay period of at least one other of the plurality of irrigation devices, such that the positioning of the irrigation valves of the plurality of irrigation devices is staggered in time.

In another embodiment, the invention can be characterized as a method for use in controlling a plurality of irrigation devices coupled to and receiving power from a multi-wire interface of an irrigation control system, the method comprising: receiving the power at each of the plurality of irrigation devices from the multi-wire interface substantially simultaneously, wherein each of the plurality of irrigation devices controls an irrigation valve; powering up a controller of each of the plurality of irrigation devices using the power; and outputting a control signal, after a delay period, to position the irrigation valve of each of the plurality of irrigation devices to a known position, wherein the delay period for at least one of the plurality of irrigation devices is different than the delay period for at least one other of the plurality of irrigation devices, such that the positioning of the irrigation valves of the plurality of irrigation devices is staggered in time.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
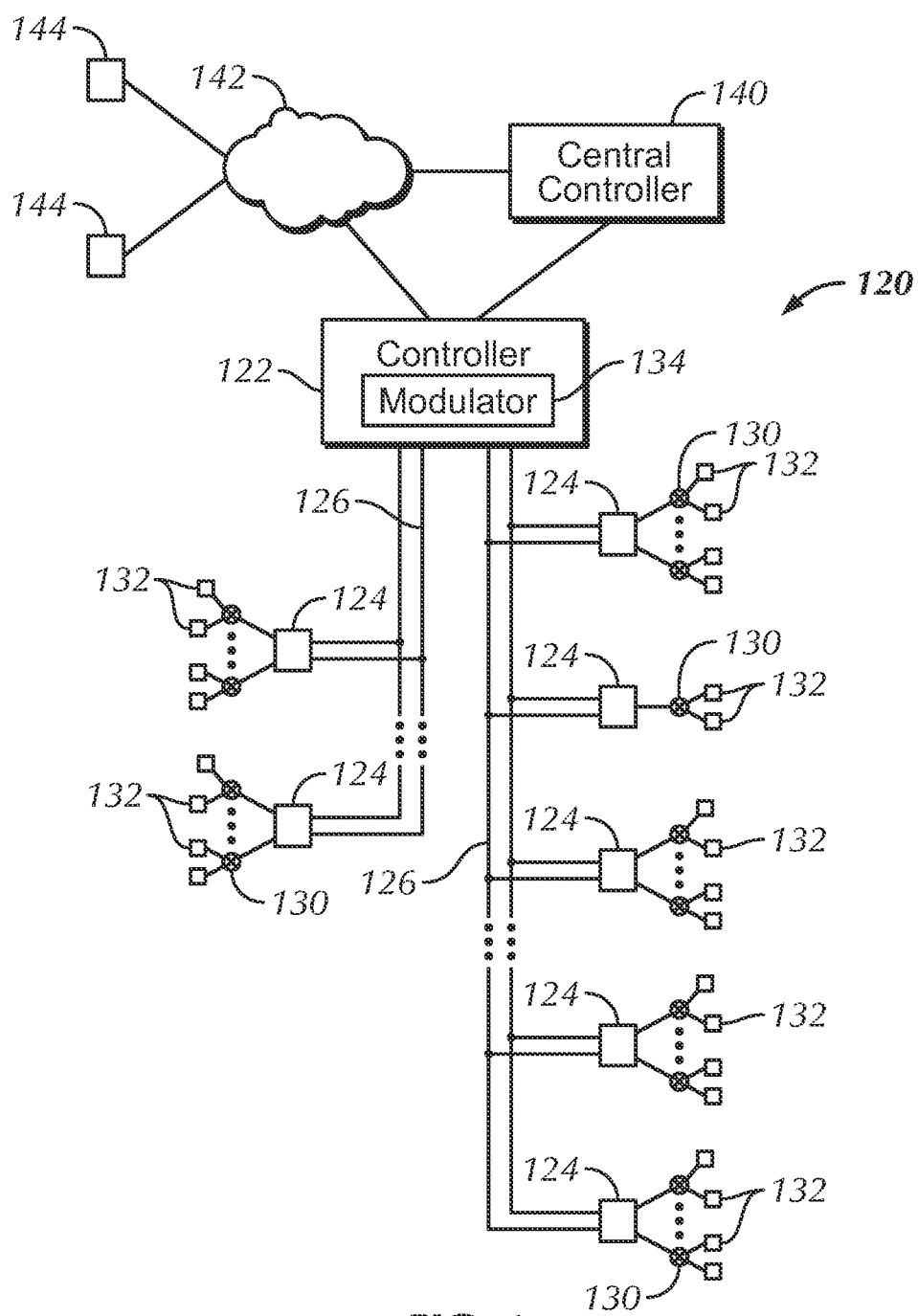
FIG. 1 depicts a simplified block diagram of an irrigation system according to some embodiments.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

FIG. 1 depicts a simplified block diagram of an irrigation system 120 according to some embodiments. The irrigation system includes an irrigation controller 122 (which may be generically referred to as an irrigation control device or an interface controller) and one or more remote irrigation devices 124 coupled with the irrigation controller through one or more two-wire power lines, paths or interfaces 126. The irrigation devices 124 can each include a demodulator and are coupled with one or more valves and/or field stations 130 that cooperate with one or more sprinklers, rotors, drip-lines, and/or or other water delivery devices 132 to supply water to the water delivery devices. In some implementations, the irrigation controller 122 is a satellite controller and further couples with a central irrigation controller 140 that provides at least some control over the irrigation controller. Typically, the central irrigation controller 140 couples with a plurality of irrigation controllers 122 and/or other such satellite irrigation controllers to coordinate the irrigation by the multiple irrigation controllers.

The irrigation controller 122 further includes a modulator 134 that allows the irrigation controller to modulate information onto an AC power signal, for example, by clipping one or more of the positive and/or negative peaks of the signals providing communication in addition to power to the one or more irrigation devices 124. Modulators are well known in the art and as such no further explanation of a modulator is provided. The irrigation devices coupled with the two-wire interface 126 draw operating power from the two-wire line and/or interface 126 as well as receive communications, such as irrigation instructions, parameters, conditions and the like that at least in part can be used in controlling and/or coordinating the implementation of irrigation and/or irrigation schedules.

Further, the irrigation controller 122 can optionally couple with one or more distributed networks 142, such as an intranet, the Internet or other such networks. It is understood that the network 142, however, can be substantially any relevant wired or wireless communication network, networks or combination of networks to communicate data, such as public switched telephone network (PSTN), cellular, paging, radio frequency broadcast, hybrid networks of one or more of fiber, cable and/or satellite, and other relevant networks, and that the irrigation controller can connect with the network through wired, wireless or a combination of wired and wireless connections. By coupling with the network the irrigation controller 122 can access other devices 144 on the network, such as servers, weather stations, databases and the like to receive and/or forward scheduling information, control information, weather information, evapotranspiration (ET) data, operating parameters, and/or other such relevant data and information.

In operation, the irrigation devices 124 receive input power signals from over the two-wired interface 126 and attempt to demodulate communications modulated onto the AC voltage input signal. In some implementations, the irrigation devices detect a synchronization pulse or other identifier and synchronize the timing and/or operation of the irrigation device based on the receipt of that synchronization. Additional data can be demodulated from the input signal. When multiple irrigation devices are active on a single two-wire interface, the power signal can include a device identifier (ID) that designates to which irrigation device or devices the communication is being directed. As such, an irrigation device can extract the device ID from the demodulated data and determine whether the communication is directed to the irrigation device. When the communication is directed to the irrigation device, the irrigation device can utilize the data demodulated and take appropriate action, such as activating or deactivating irrigation, implementing instructions or schedules, altering parameters and the like.

Figure 2:
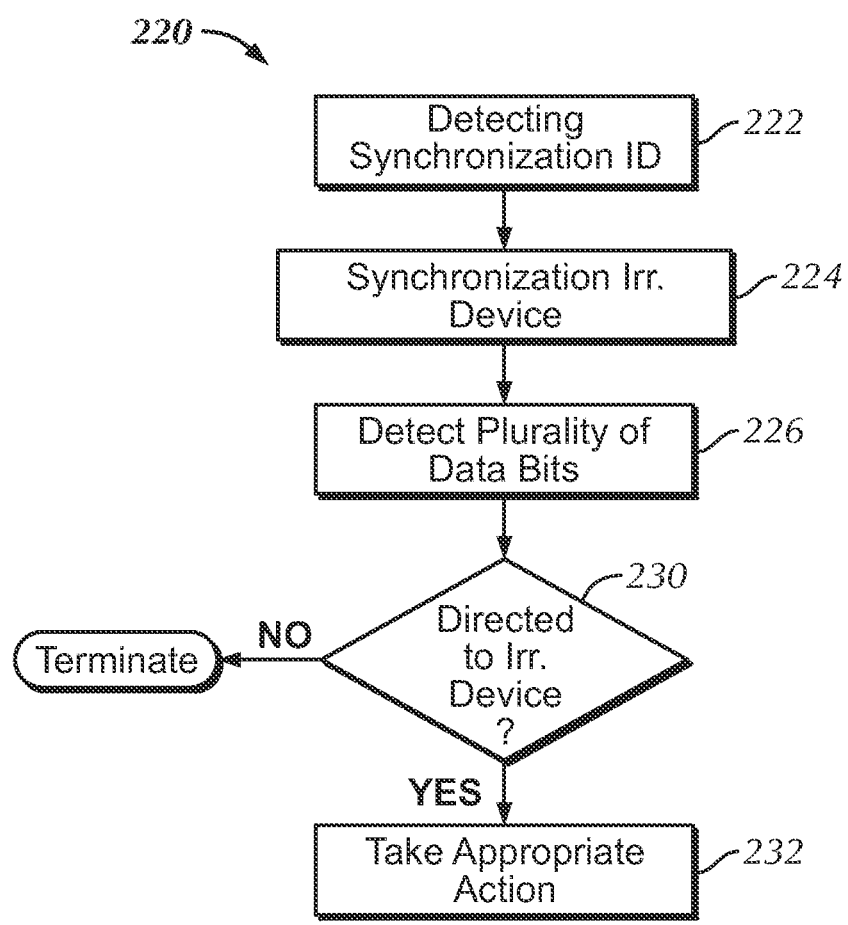
FIG. 2 depicts a simplified flow diagram of a process of receiving communications and/or controlling irrigation according to some embodiments.

FIG. 2 depicts a simplified flow diagram of a process 220 of receiving communications and/or controlling irrigation according to some embodiments. In step 222, a synchronization identifier is detected. The synchronization identifier typically is defined by a modulated pulse or series of pulses that can be distinguished from other modulation, such as a predefined pattern, attenuating or clipping a predefined portion of a pulse (e.g., clipping a negative side of a pulse), attenuating one or more pulses by a predefined amount or other such detectable modulation.

In step 224, the irrigation device is synchronized, for example, noting a relationship between the receipt of the synchronization and one or more internal clocks and/or timers, adjusting one or more internal clocks and/or times, and/or internal component operations and/or other such synchronizations. For example, in some embodiments synchronization provides a known starting point for the irrigation device and/or processes of the irrigation device, to restart clocks and prepare to receive data over the two-wire path. In step 226, a plurality of data pulses are detected and demodulated. These data pulses can include device ID, instructions, parameters and/or other such information as described above and further below. In step 230, it is determined whether the data being received over the two-wired interface are directed to the irrigation controller. When the communication is not directed to the irrigation controller the process 220 terminates and/or returns to step 222 to await a subsequent synchronization. Alternatively, step 232 is entered where the irrigation device 124 takes appropriate action, such as activating irrigation, interrupting and/or stopping irrigation, changing parameters, determining local parameters and transmitting a communication based on the determined parameters, and/or other such action.

Figure 3:
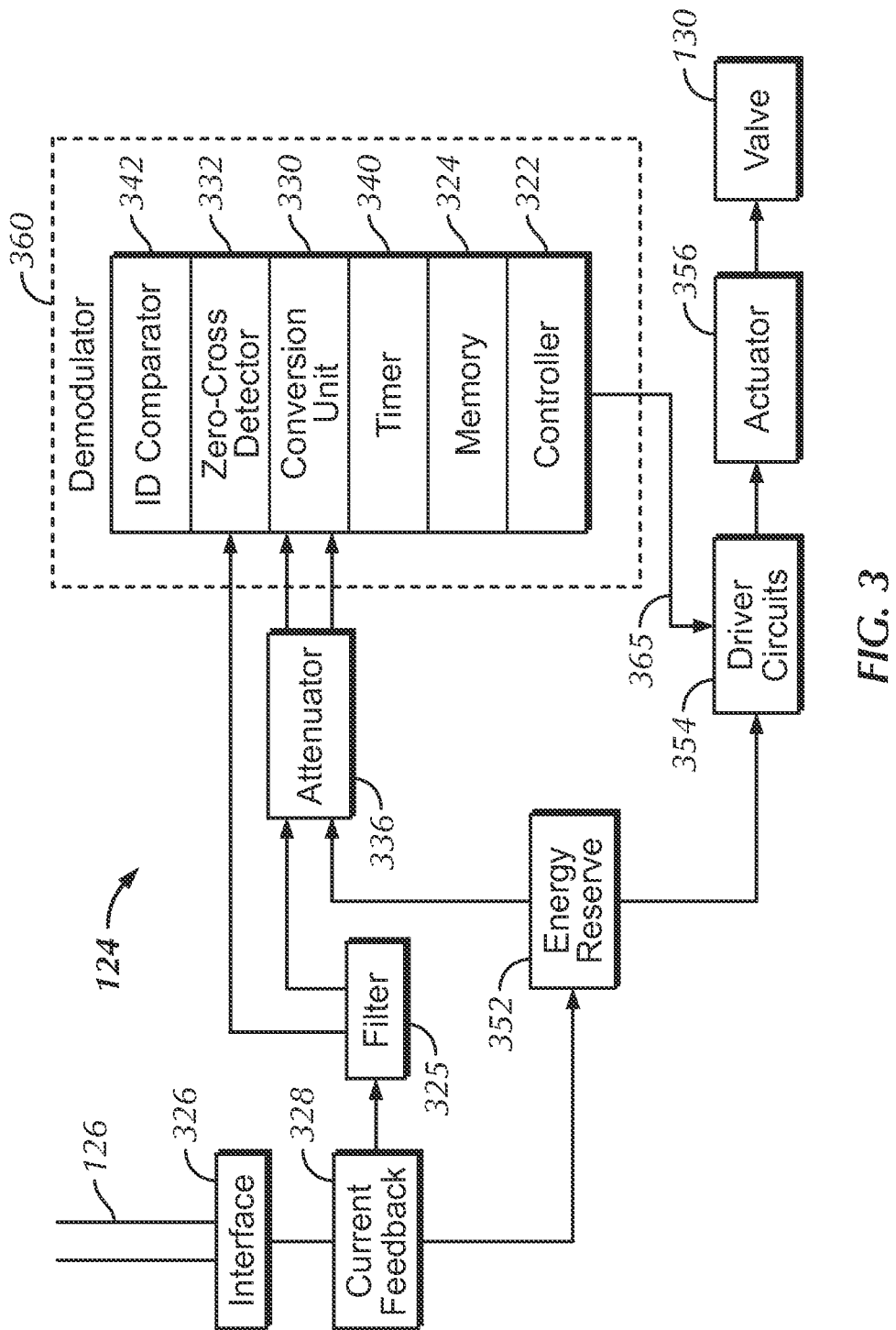
FIG. 3 depicts a simplified block diagram of an embodiment of an irrigation device that couples with and controls field stations and further couples with a two-wire interface to receive power as well as irrigation control instructions, parameters and/or other such communications.

FIG. 3 depicts a simplified block diagram of an embodiment of an irrigation device 124 that couples with and controls field stations 130 and further couples with a multi-wire interface, such as two-wire interface 126, to receive power as well as irrigation control instructions, parameters and/or other such communications. Numerous irrigation devices 124 (e.g., tens to hundreds) can be coupled with a single two-wire interface 126. The irrigation device 124 includes an interface 326, a current feedback 328, a filter 325, an attenuator 336, an energy reserve 352, driver circuits 354, actuator 356, an irrigation valve 130 and a demodulator 360. In the illustrated embodiment, the demodulator 360 includes a controller 322, one or more memory 324, an Analog to Digital conversion unit 330, a zero-cross detector 332, one or more timers 340 (such as crystal-based clocks), and a device ID comparator 342. Under control of the controller 322, the irrigation device 124 can at least activate and deactivate irrigation by controlling water flow through the valve 130. The components of the irrigation device can be coupled through one or more direct connections, busses and/or other relevant coupling. The energy reserve 352 and/or other back up power provides power to allow the irrigation device 124 to turn on/off irrigation or initiate/terminate irrigation according to locally stored irrigation scheduling should power over the two-wire interface be interrupted. Power from the two-wire interface 126 can, in some instances, be used to store power in the energy reserve 352. While one energy reserve 352 is illustrated, it is understood that the energy reserve 352 may comprise multiple energy reserves. The energy reserve 352 may include one or both of a battery and capacitor. In preferred form, the one or more energy reserves 352 rectifies an incoming sinusoidal alternating power signal and includes one or more capacitors that are charged by power received from the two wire interface 126 and discharged using the driver circuits 354 to provides bursts of energy to open and close the actuator 356, e.g., a latching solenoid, controlling the irrigation valve 130. In some embodiments, the energy reserve 352 stores power to provide DC power to the demodulator 360 and other components of the device 124. The energy storage 352 can provide power in the event of disruption of power from the two wire interface 126.

The irrigation device 124 can be implemented through hardware, software, firmware or a combination of hardware, software and firmware. In some implementations, one or more components of the irrigation device are implemented through a single microprocessor, integrated circuit, microcontroller or other device. Additionally or alternatively, one or more of the components of the irrigation device can be integrated with the controller 322. For example, some or all of the memory 324, the zero-cross detector 332, the conversion unit 330, the timer 340, ID comparator 342, the driver circuits 354 and/or other components could be implemented in whole or in part through the controller 322. The irrigation device 124, can in some implementations, include a demodulator 360 that comprises one or more components in demodulating the received input signal, such as the controller 322, the memory 324, the conversion unit 330, the zero-cross detector 332, the ID comparator 342 and/or one or more timers 340. In some embodiments, many of the components of the irrigation device 124 are implemented through a microcontroller, such as one of the series of PIC16F677, 687, 689 manufactured by Microchip Technology, Inc. of Chandler, Ariz. or other similar controller.

The controller 322 can be implemented through one or more processors, microprocessors, microcontrollers, state machines or other such relevant controllers or combinations of controllers that provide overall functionality, data processing, and control over the irrigation device 124. The one or more memory 324 can store software programs, executables, data, irrigation control programming, scheduling, runtime parameters, soil conditions and parameters, other relevant programs and data, and instructions executable by a processor, machine or computer. The memory can be implemented through ROM, RAM, EEPROM, volatile disk drives, flash memory, removable medium (e.g., floppy disc, hard disc, compact disc (CD), digital versatile disc (DVD), flash memory, and the like), and substantially any other relevant memory or combinations of memory. Generically, the memory 324 may also be referred to as a computer readable medium.

As introduced above, the controller and/or other components of the irrigation device 124 can be implemented by software stored in memory and executed on a microcontroller or processor, or otherwise stored and executed in firmware. Further, the controller and/or other components can be implemented through logic devices, hardware, firmware and/or combinations thereof. Thus, the processing described herein may be performed using substantially any relevant processor logic or logic circuitry.

The modulated alternating signal is received at the interface 126 from the two wire interface 126. In one embodiment, the interface 126 is simply a physical connection point, connector or coupler for electrically and mechanically coupling the multi wire interface 126 to the irrigation device 124. In normal operation, the received alternating signal passes through the optional current feedback 328 and is filtered by the filter 325, attenuated by the attenuator 336, and converted by the conversion unit 330. The attenuator 336 attenuates the signal generating a data signal (VDATAF) that is at a level that is more readily utilized by the irrigation device 124. For example, in some instances, the voltage is attenuated to a level that can be utilized in integrated circuits, such as about 5V or less. Further in some embodiments, the conversion unit 330 identifies or extracts an input signal reference voltage (VR-EFF) as a reference level and/or bias level in further processing the input signal.

The zero-cross detector 332 monitors input 326 and informs the controller 322 when a positive going voltage has crossed from negative to positive. The timer 340 indicates a desired delay after the zero crossing and the controller 322 uses the analog to digital conversion unit 330 to measure the voltage level. In one embodiment, the controller 322 compares this measured voltage to a threshold voltage level set in the memory 324. This voltage level is used to determine clipped waveforms representing logic "0" or non-clipped waveforms representing logic "1".

Data bits encoded on the signal can further activate or awaken at least a portion of the irrigation device 124 from a dormant or sleep state that significantly reduces power consumption. The timer 340, in some embodiments, is utilized in cooperation with the controller 322 to identify data bits and/or synchronization based on one or more time thresholds, for example, time since a detection of a data bit. The timer 340 can also further activate or awaken at least a portion of the irrigation device 124 from a dormant or sleep state that significantly reduces power consumption.

The ID comparator 342 extracts data from the received bits to determine whether the communication modulated on the input signal is directed to the irrigation device 124 and/or identifies parameters, instructions and/or requests. The controller 322 can implement one or more instructions, such as activating or deactivating one or more field stations 130, adjust parameters and/or implement other operations.

In some cases it is desirable for irrigation device 124 to provide feedback to the entity providing input signal (e.g., irrigation controller 122). For example, it is common for the irrigation devices to acknowledge that they received and executed commands and instructions provided by the irrigation controller 122. This feedback may occur by the irrigation device shunting the power line (two wire interface 126) through a resistor used to receive input signal, which provides current feedback to the irrigation control system. That is, the shunting or shorting of the power lines causes a current draw (voltage drop) at a designated time that is detected by controller 122 or other device containing the modulator 134. In the embodiment of FIG. 3, the optional current feedback 328 provides the shunting as directed by the controller 322 during designated feedback or communication times. In one embodiment, the current feedback 328 includes a switch (for example, an electronic switch, such as a triac) and resistor (not shown), the switch selectively coupling the two wires of the two wire interface 126 together through the resistor when directed by the controller 322.

In FIG. 3, irrigation device 124 is shown having energy reserve 352 in communication with conversion unit 330 via attenuator 336, which operates under the control of controller 322. The controller 322 also controls the driver circuits 354 to activate and deactivate irrigation. Energy reserve 352 is shown to provide power to actuator 356 controlling the valve 130 via driver circuits 354. Energy reserve 352 is charged by the alternating power signal received at the interface 326.

In an embodiment, the energy reserve 352 functions as a stored energy source or as a stored energy reserve providing power to the actuator 356, for example, a latching or non-latching solenoid, to open and/or close an associated irrigation valve (e.g., valve 130) to effect irrigation. The energy reserve may be implemented using a device (e.g., a battery and/or capacitor) capable of providing desired power to the actuator.

If desired, energy reserve unit 352 may be implemented using one or more additional energy reserves (i.e., in addition to energy reserve 352). Such additional energy reserves may be used to power actuator 356 as needed or desired. An example of a technique for implementing this multiple energy reserve aspect is disclosed in copending application Ser. No. 12/341,764, filed Dec. 22, 2008, and entitled "LATCHING SOLENOID ENERGY RESERVE," which is assigned to Rain Bird Corporation, which is the assignee of the present disclosure, this application is incorporated herein by reference. Since the particular device or devices used to power actuator 356 is not critical to various embodiments of the present invention, further description of such devices has been omitted for clarity.

As noted above, actuator 356 is usually coupled to a suitable irrigation valve, such as valve 130, which in turn is coupled to a water supply line on one end and to one or more water delivery devices on the other end. The type of valve and water delivery devices utilized is not critical to various embodiments of the present invention, and thus, further description of such components has been omitted.

Actuator 356 is typically implemented using a latching solenoid which requires a certain amount of energy to open and close. A feature of the latching solenoid is that it may be configured to control water flow to one or more water delivery devices. In one position (e.g., the open position), the actuator (e.g., latching solenoid) causes the valve to be in an open valve position to allow water flow therethrough. In another position (e.g., the closed position), the actuator (e.g., latching solenoid) causes the valve to be in a closed valve position which prevents the flow of water therethrough. A latching solenoid generally has lower power demands as compared to a typical non-latching solenoid. For instance, a typical non-latching solenoid requires continual power to maintain the open valve position, the removal of power putting the valve in the closed valve position. Latching solenoids, on the other hand, only require a power burst to open or close; no power is needed to maintain the latching solenoid (and thus, the valve) in the open or closed position.

Accordingly, capacitors are well suited energy storage devices useful to provide the short burst of power needed to move the actuator 356. For example, in some embodiments, the energy reserve 352 includes a capacitor that is charged using the received alternating power signal. The capacitor is discharged to provide the current burst needed to actuate the latching solenoid. Once discharged, the capacitor immediately draws power from the alternating power signal to recharge. When many irrigation devices 124 (e.g., tens to hundreds) are coupled to the two-wire interface 126, there can arise situations where large numbers of the capacitors of the energy reserves 352 need to be charged or recharged at substantially the same time. This can create in-rush currents or loading of the two-wire interface 126. Such in-rush currents can cause the irrigation controller 122 (or other interface controller device) to experience high current loading and cause false indications of a short in the two-wire interface 126.

However, in some embodiments, occasions arise during which it is desirable or necessary to power-up a large population of irrigation devices 124. By way of non-limiting example, various embodiments will be described in the context of a system initialization operation, which is one scenario during which a relatively large population of irrigation devices will undergo power-up within a short period of time. A typical system initialization operation may involve powering-up a number of irrigation devices (e.g., 20-800, or more) simultaneously or substantially simultaneously. A system initialization operation is commonly performed after installing irrigation devices or as part of ongoing, periodic system or field maintenance operations.

In one embodiment of system initialization, the irrigation devices 124 are coupled to the two-wire interface 126, but power has not yet been applied to the two-wire interface, or power to the two-wire interface 126 was terminated to reset the system. During system initialization, it is desirable for the irrigation devices to close their respective solenoids/valves so that the entire system of irrigation devices is in a known condition, and more particularly, in a non-irrigation position. This is a useful procedure in new installations, for example, in which it is common for workers to install irrigation devices with solenoids in an open state. If the entire system does not undergo an initialization process during which the solenoids of the various irrigation devices 124 are commanded closed, active irrigation may occur even though the system has not yet issued an irrigation instruction.

To initiate system initialization according to some embodiments, the irrigation controller 122 applies the alternating power signal (e.g., a 24 VAC sinusoidal power signal) to the two-wire interface. In the embodiment of FIG. 3, within microseconds of when the power is applied, the energy reserve/s 352 of each of the population of irrigation devices 124 begins to charge. That is, the energy reserve 352 first undergoes a charge period during which the energy reserve is charged to a threshold or desired voltage. This voltage threshold may be characterized as the amount of voltage necessary to power actuator 356. The current needed to charge the energy reserve 352 is provided, in many cases, by irrigation controller 122 via interface 126. In a large system, since all irrigation devices 124 are undergoing the charge period, an in-rush current is caused at the irrigation controller 122, potentially resulting in unstable power or temporary shut down of the power application. The energy reserves will eventually become charged, for example, in a matter of 30 seconds to several minutes.

During this power-up process, each of the irrigation devices 124 will typically initialize needed instructions, parameters, and other operational data. The irrigation device 124 will use the received power stored in the energy reserve to power-up the general operating components, such as controller 322. In some embodiments, the power-up process occurs as a result of the initial application of power to the two-wire interface 126.

In some embodiments and still part of the system initialization process, once the energy reserve 352 of each irrigation device is charged, the respective irrigation devices 124 are configured to trigger the closing of the valve. For example, the controller 322 determines that the energy reserve 352 is charged to the desired level, and then sends a command to the driver circuits 354 to cause the energy reserve 352 to discharge its stored energy through the driver circuits 354 to provide a burst of current or power to the actuator 356 (e.g., a latching solenoid) to move the actuator 356 to the valve closed position. As a result, the actuator 356 moves the valve 130 to the closed position if it was open, or keeps the valve 130 in the closed position if the valve was closed. Similarly, if the valve 130 is partially open, the actuator 356 causes the valve to be moved to the closed position.

At this point, the discharged energy reserves 352 of the population of irrigation devices 124 will immediately, and substantially at the same time, begin to recharge. This again can cause in-rush currents or high current loading at the irrigation controller 122 and falsely indicate a short in the two-wire interface 126. Again, as with the initial charge up, the energy reserves of the population of irrigation devices 124 will charge. However, in some embodiments, the problem is that due to the delayed recharging and unstable power, some of the irrigation devices 124 will behave as if they are initially charging, and not recharging. That is, the intended operation in some embodiments is that the irrigation devices will recharge their energy reserves 352 and then be charged and ready to receive instructions to turn on irrigation at a later point. But, by behaving as if they are initially charging, the irrigation devices 124 will immediately discharge the energy reserve 352 to try to close the actuator 356/valve 130 (which is already closed), and then recharge again. With a large population of irrigation devices 124, many of the irrigation devices 124 will oscillate between charging the energy reserve, then discharging the energy reserve to close the valve, then recharge and discharge to close the valve, then recharge again and discharge to close the valve, and so on. In this case, the irrigation devices do not become ready for normal operation.

To minimize or eliminate these and other problems, various embodiments charge the energy reserves of individual irrigation devices 124 in a time-staggered fashion. One technique for accomplishing this is to recharge the energy reserves after delaying for a period of time beyond the time recharging would otherwise begin. If each of the irrigation devices delays for a different period of time, then their respective energy reserves will be recharged during different periods of time, spreading the recharging period over time for the population of irrigation devices. Various techniques for providing this variable delay will be described in more detail.

Figure 4:
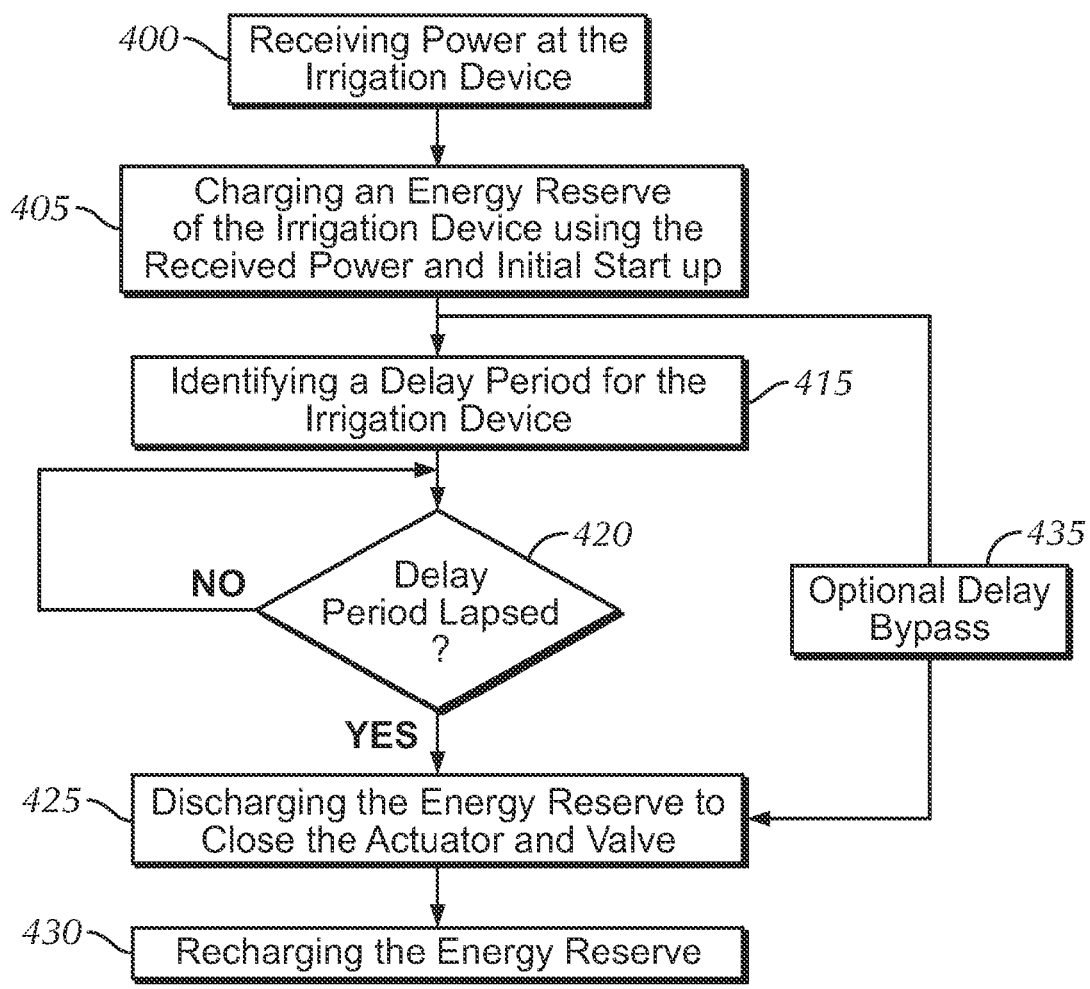
FIG. 4 is a flowchart depicting a method for controlling an irrigation device in accordance with an embodiment of the invention.

FIG. 4 is a flowchart depicting a method for controlling an irrigation device in accordance with an embodiment of the present invention. This method will be described with occasional reference to the irrigation device 124 depicted in FIG. 3, but it is understood that the disclosed method is not limited to the depicted irrigation device, or any other device. In accordance with various embodiments, the operations of FIG. 4 may be performed by some or all of the irrigation devices 124. In one embodiment, the process of FIG. 4 represents a system initialization process for an irrigation control system including a population of irrigation devices 124. For example, to begin the initialization, the irrigation controller 122 is turned on to provide an alternating power signal to the two-wire interface 126.

Block 400 includes receiving power at an irrigation device, for example, as part of an initialization operation. This irrigation device receives power from the irrigation controller 122 via the two-wire interface 126 at a substantially the same time as all other irrigation devices receive power. In one embodiment, the irrigation devices receive power within microseconds of each other. Consequently, a large number of irrigation devices substantially simultaneously receive power. In some cases, as many as 200 to 800, or more, irrigation devices receive this power. In one embodiment, the power signal takes the form of an alternating sinusoidal power signal.

Block 405 refers to charging the energy reserve of the irrigation device using the received power. This operation is typically necessary since the energy reserve 352 is typically installed in a non-charged state, or less than a fully charged state at start up. At the start of this initial charge up, the operational components of the irrigation device are not operating since they get operational power from the energy reserve. Thus, as described above, since all irrigation devices are drawing charging current at substantially the same time, the irrigation controller 122 (or other interface controller) experiences large in-rush currents and current loading, and may become unstable. For example, the irrigation controller may falsely determine a short exists in the two-wire interface. Eventually, the energy reserve will fully charge (as will all other energy reserves of all other irrigation devices). The typical time constant of the capacitors used in the energy reserve typically provides for full charging within about 5 seconds given a stable charging source. However, in systems with a large population of irrigation devices, the high in-rush current causes the charge up period to occur over a longer period, for example, 20-40 seconds. This charging process is an uncontrolled initial power up process.

At this point, the energy reserve is fully charged, and the irrigation device 124 has started up and can perform operations, such as initializing needed instructions, parameters, and other operational data. The irrigation device will also power-up the general operating components, such as controller 322, and other components of the demodulator 360 and irrigation device. In this embodiment, the controller 322 is configured to store instructions in memory to charge up the energy reserve, then discharge it to close the valve/s it is controlling. However, according to several embodiments, instead of immediately discharging the energy reserve to close the valve, the controllers 322 of the irrigation devices variably delay the discharge of the energy reserves over a period of time; thus, spreading the time period for the initial discharging, and accordingly, spreading the time period for the ensuing recharge time period. This results in a controlled discharge of the energy reserves in the system.

Block 415 includes identifying a delay period for the irrigation device, for example, once the energy reserve is charged to a desired level. In an embodiment, this delay period is different than a delay period of at least one other irrigation device. In some cases, many of the irrigation devices 124 will have a unique delay period, while some will have the same delay period. In other cases, all of the irrigation devices will have a unique delay period. Increasing the number of irrigation devices which have a unique delay period will generally result in an increasingly steady current demand at irrigation controller 122 during uncontrolled power-up (block 405). In an embodiment, the delay period defines a period of time that the irrigation device is to delay before triggering the energy reserve to be discharged to close the valve.

No particular delay period is required, but a typical example is one in which all of the irrigation devices are powered-up over a 60-90 second time period. As such, the delay period will range from 0 to the upper limit of the time period (e.g., 0-60 seconds, 0-75 seconds, 0-90 seconds, and the like). It is noted that in some embodiments, the time delays are determined to be longer than it typically takes to charge a given energy reserve.

A number of different techniques may be used to implement the delay period identification. For instance, the delay period may be identified by obtaining (e.g., from memory 324) an identifier that identifies the irrigation device, and then determining the delay period based upon at least a portion of the identifier. If all of the irrigation devices have a unique identifier (e.g., serial number, a portion of a serial number, and the like), then the calculated delay period will likewise be unique. It is again noted that it is not a requirement that all of the identifiers be unique.

One particular example for identifying (or determining) the delay period includes identifying a number of least significant bits (LSBs) of a device identification number associated with the irrigation device, and then multiplying the identified LSB by a delay value. This delay value may be a constant which results in a delay period that falls within the desired delay period range. In one embodiment, the LSB is multiplied by 261 msec, for example.

Another example utilizes a counter for which the identifier of the irrigation devices is used as the seed for the delay. This counter has a range over the entire delay period (e.g., 0-75 seconds). In another embodiment, a pseudo random seed number is stored in the memory 324 during manufacturing and used as a seed for the delay period.

According to block 420, a delay period occurs by continuing to loop until the delay period has lapsed and control flows to block 425. In one example, the timer 340 is used in determining when the delay period has lapsed.

At block 425, the charged energy reserve is then discharged to close the actuator and valve. In one embodiment, such as illustrated in FIG. 3, once the controller 322 has determined that the delay period has lapsed, the controller 322 outputs a control signal 365 to the driver circuits 354, which function as a switch to discharge the energy reserve 352. The current or power burst provided by the discharging energy reserve 352 couples to the actuator 356 via the driver circuits 354 and causes the actuator to move to its closed position, which in turn causes the valve 130 to be moved to the closed position if it is open or keeps the valve 130 in the closed position if the valve was closed. Similarly, if the valve 130 is partially open, the actuator 356 causes the valve to be moved to the closed position.

As a population of many irrigation devices 124, due to the various time delay periods of each irrigation device 124, many of the energy reserves 352 of the population of irrigation devices are discharged at different times relative to each other in a time staggered manner. Some may be discharged at the same time as others, or the discharge may overlap. However, the effect is that the discharge of the energy reserves to put all valves in the system in the closed position is spread over the delay period.

It is understood that this closing operation will again, in many instances, cause a current draw on the system in order to recharge the energy reserve using power received via interface 126. That is, at block 430, once the energy reserve is discharged, the energy reserve immediately begins to draw current to recharge. Once recharged, the energy reserve 352 is ready for normal operation and the valve 130 is in a known closed state. Due to the time delays, in the context of the population of irrigation devices 124, the energy reserves 352 will consequently recharge at different times spreading out throughout the recharge period. This is because the delay induced by blocks 420 and 425 will propagate forward to the recharging operation of block 430. That is, since each of the irrigation devices will discharge their respective stored energy reserves in a time staggered fashion (via delay period 415), then each of the irrigation devices will likewise discharge to close their respective actuators in a pseudo random, staggered fashion. Consequently, each of the irrigation devices will recharge their respective stored energy sources at a different period of time, and thus, simultaneously drawing current by all of the irrigation devices is avoided. That is, by spreading out the time for the recharge cycle, the problem described above with large in-rush currents that result in many of the irrigation devices oscillating between charging and discharging the energy reserve to close the valve since during the recharge process, the line voltage drops below a reset level and the irrigation device behaves as if it were initially charging (as in block 405).

It is understood that the current draw (block 430) occurring after the solenoid closing operation of block 425 may overlap with initial charging operations of blocks 420 and 425) being performed in other irrigation devices. However, this is not overly significant since various embodiments do not require that only a single irrigation device is to draw current at any given time (although this feature is possible in some instances). Instead, such embodiments relate to the circumstance where all of the irrigation devices, which could be several hundred, are not simultaneously drawing current from the same irrigation controller 122.

In one embodiment, the steps of blocks 415, 420, 425 and 430 may be generally referred to as controllably discharging and recharging an energy reserve of each of the plurality of irrigation devices after the delay period lapses at each of the plurality of irrigation devices to provide a time staggered recharging of the energy reserves across the plurality of the irrigation devices.

In another embodiment, the controller is configured to provide an exception or bypass to the introduction of the variable delay (block 435) during the manufacturing process. Although generally it is desirable to time stagger the charging of turn-on times when installed in the field the same feature causes a delay to manufacturing processes. To eliminate manufacturing delays a counter is introduced to skip turn-on delays for the first n (e.g. eight) power-up cycles. Each skip leads the process from block 405 directly to block 425 via block 435. By skipping turn-on delays for a fixed number of cycles, production can proceed at maximum speed while retaining the feature for end-applications.

Figure 5:
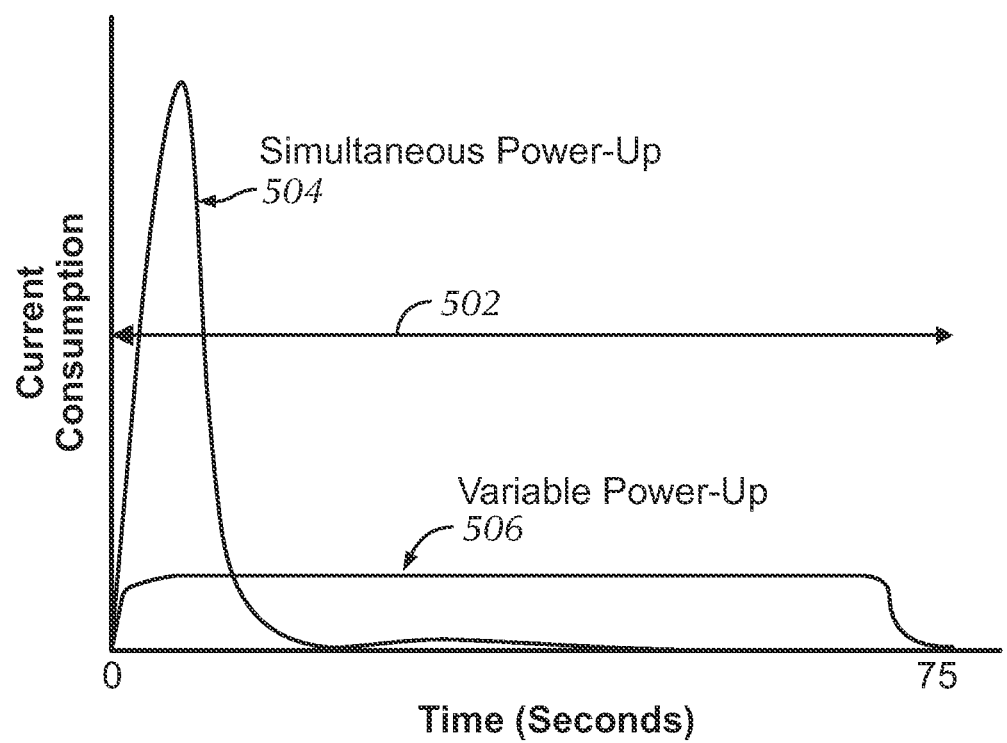
FIG. 5 is a graph showing an example of current consumption when all irrigation devices draw current at substantially the same time relative to when one or more of the irrigation devices draw power in a time staggered manner according to one embodiment.

FIG. 5 is a graph showing an example of current consumption when all irrigation devices draw current (e.g., during the recharge operation of block 430 of FIG. 4) at substantially the same time relative to when one or more of the irrigation devices draw power in a time staggered fashion according to one embodiment. The y-axis relates to the collective current consumption of irrigation devices 124, as supplied by irrigation controller 122 (or other interface controller). The x-axis relates to the time at which the current demand occurs. The example of FIG. 5 depicts a current draw operation occurring during an example 75 second power-up period 502. This power-up period relates to the delay period range (0-75 seconds) utilized by the irrigation devices. Two scenarios are depicted. One scenario 504 relates to simultaneous, or substantially simultaneous, current draw or power-up of all irrigation devices, which can number in the hundreds, for example, 200-800 irrigation devices. The other scenario 506 relates to the variable or staggered power-up of the irrigation devices resulting from, for example, the delay period feature described with regard to FIG. 4.

In the uncontrolled, simultaneous power-up scenario 504, a significant power spike is present at the early stages of the charging processes. This power spike is shown occurring over an approximate 15 second time period, after which the current draw falls to a negligible level. What this means is that all of the irrigation devices are powered-up, including the charging of their respective energy reserves, within the depicted 15 second time period. This current draw is particularly taxing on irrigation controller 122, and irrigation devices 124 may become current starved, especially when hundreds of irrigation devices are drawing current to charge their energy reserves at the same time. Such a power spike could occur during the initial charge up (e.g., block 405) and during the recharge process if the variable delay of blocks 415 and 420 is not implemented if these operations were performed for most or all of the irrigation devices at about the same time. In some cases, the time needed to charge all energy reserves would be greater than illustrated since the irrigation controller 122 would be under heavy current loading conditions and it may falsely detect a short in the two-wire interface 126. The energy reserves should all charge to the desired level. In the event the charging cycle is part of an initialization process where the irrigation devices 124 are configured to charge up to disclose to close the valve upon the first application of power, the simultaneous power-up portion 504 could put the system in a reset/oscillation mode where the line voltage would continually drop below a reset level and the field of irrigation devices 124 would continuously go through initialization (repeatedly turning off, dropping system voltage, come back through reset, etc) such as described above.

The depicted variable power-up scenario 506, on the other hand, shows an initial current draw at the beginning of the recharging process (e.g., block 430), which is then held at a relatively constant rate for the duration of the process. The variable recharging process takes longer to bring all of the irrigation devices online as compared to the substantially simultaneous charging scheme. However, this is not significant since the recharging processes of the irrigation system are generally not time critical in some embodiments. Taking an additional 60 seconds, for example, to charge hundreds of irrigation devices, is a generally acceptable inconvenience in order to avoid an undesirable power spike that would otherwise occur.

Figure 6:
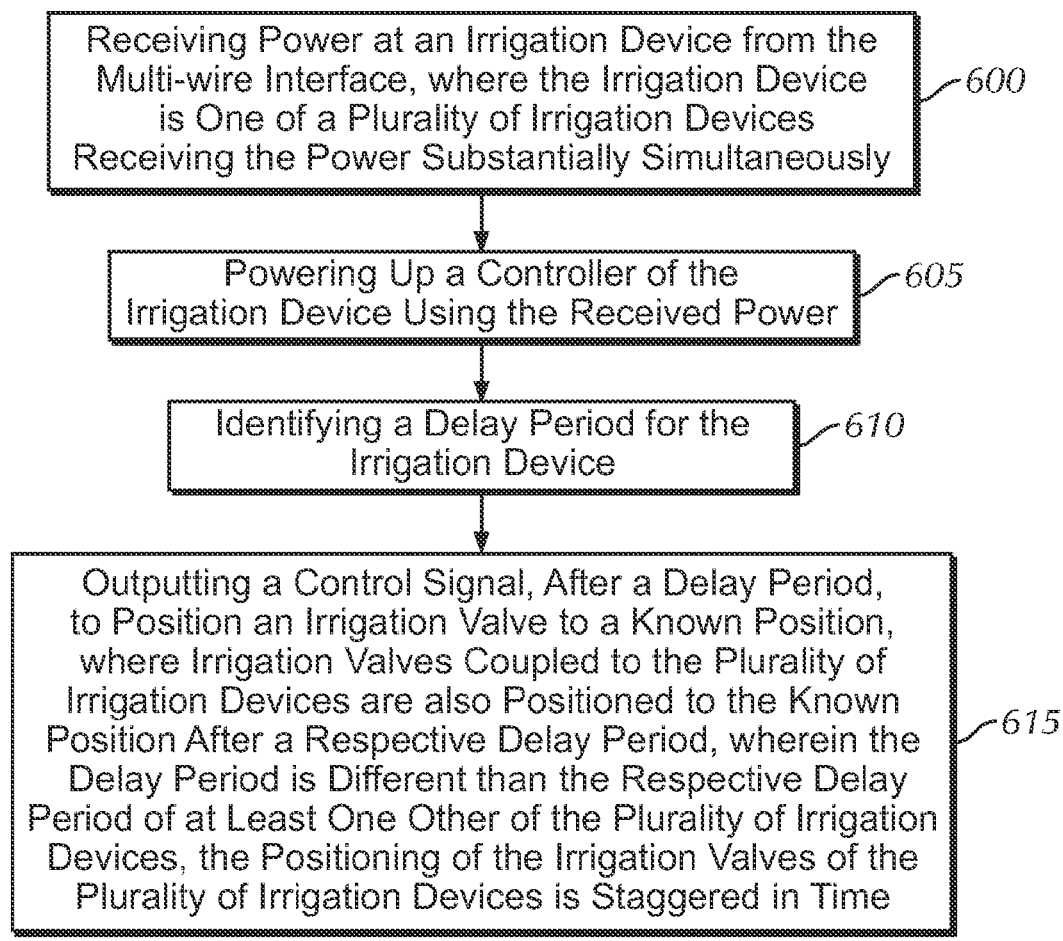
FIG. 6 is a flowchart depicting a method for controlling an irrigation device in accordance with another embodiment of the invention.

Referring next to FIG. 6, a flowchart depicting a method for controlling an irrigation device is shown in accordance with another embodiment of the invention. This method will be described with occasional reference to the irrigation device 124 depicted in FIG. 3, but it is understood that the disclosed method is not limited to the depicted irrigation device, or any other device. In accordance with various embodiments, the operations of FIG. 6 may be performed by some or all of the irrigation devices 124. In one embodiment, the process of FIG. 6 represents a system initialization process for an irrigation control system including a population of irrigation devices 124. For example, to begin the initialization, the irrigation controller 122 is turned on to provide an alternating power signal to the two-wire interface 126.

Block 600 includes receiving power at an irrigation device from the multi-wire interface (e.g., two-wire interface 126), where the irrigation device is one of a plurality of irrigation devices receiving the power substantially simultaneously. In one embodiment, the irrigation devices receive power within microseconds of each other. Consequently, a large number of irrigation devices substantially simultaneously receive power. In some cases, as many as 200 to 800, or more, irrigation devices receive this power. In one embodiment, the power signal takes the form of an alternating sinusoidal power signal.

Block 605 refers to powering up a controller of the irrigation device using the received power, e.g., powering up controller 322. As described above, the controller receives its operational power from the energy stored in the energy reserve 352, e.g., a DC voltage signal. In a system of many irrigation devices 124, the controllers of all irrigation devices are powered up as well. Generally, since the irrigation devices receive power at substantially the same time, the controllers are generally powered on at about the same time.

Not illustrated in FIG. 6, but in some embodiments, at the same time as Block 605, the energy reserve of the irrigation device is charged using the received power similar to that described in Block 405 of FIG. 4. As described above, in a system with many irrigation devices, since the energy reserves 352 of all irrigation devices are drawing charging current at substantially the same time, the irrigation controller 122 (or other interface controller) experiences large in-rush currents and current loading, and may become unstable. Eventually, the energy reserve will fully charge (as will all other energy reserves of all other irrigation devices), such as described further in connection with FIG. 4.

In one embodiment, the controller 322 is configured to store instructions in memory to actuate the irrigation valve it is connected to in order to place the valve in a known position, such as in the closed position. However, according to several embodiments, instead of immediately actuating the valve to the known position, the controllers 322 of the irrigation devices variably delay this actuation and valve positioning over a period of time; thus, spreading the time period for the initial positioning of the valves to the known position.

Block 610 includes identifying a delay period for the irrigation device, the delay period to be used in delaying the positioning of the irrigation valve to the known position. In an embodiment, this delay period is different than a delay period of at least one other irrigation device. In some cases, many of the irrigation devices 124 will have a unique delay period, while some may have the same delay period. In other cases, all of the irrigation devices will have a unique delay period. In an embodiment, the delay period defines a period of time that the irrigation device is to delay before triggering the positioning of the valve to the known position.

No particular delay period is required, but a typical example is one in which all of the irrigation devices are powered-up (block 605) over a 60-90 second time period. As such, the delay period will range from 0 to the upper limit of the time period (e.g., 0-60 seconds, 0-75 seconds, 0-90 seconds, and the like). It is noted that in some embodiments, the time delays are determined to be longer than it typically takes to charge a given energy reserve.

A number of different techniques may be used to implement the delay period identification, such as those described in connection with block 415 of FIG. 4.

Next, at block 615, a control signal is output after the delay period to position the irrigation valve to a known position (e.g., a closed or non-watering position). The irrigation valves coupled to the plurality of irrigation devices are also positioned to the known position after a respective delay period, wherein the delay period is different than the respective delay period of at least one other of the plurality of irrigation devices, the positioning of the irrigation valves of the plurality of irrigation devices is staggered in time.

In one embodiment, such as illustrated in FIG. 3, once the controller 322 has determined that the delay period has lapsed (e.g., using timer 340), the controller 322 outputs a control signal 365 to the driver circuits 354, which function as a switch to discharge the energy reserve 352. Thus, the discharging of the energy reserve is responsive to the control signal 365. The current or power burst provided by the discharging energy reserve 352 couples to the actuator 356 (e.g., a latching solenoid) via the driver circuits 354 and causes the actuator to move to its closed position, which in turn causes the valve 130 to be moved to the closed position if it is open or keeps the valve 130 in the closed position if the valve was closed. Similarly, if the valve 130 is partially open, the actuator 356 causes the valve to be moved to the closed position. Accordingly, the irrigation valve is positioned to a known position. Additionally, in one embodiment, the positioning of the irrigation valve 130 to the known position uses energy from the energy reserve.

As a population of many irrigation devices 124, due to the various time delay periods of each irrigation device 124, many of the irrigation valves 130 of the population of irrigation devices are positioned to the known position at different times relative to each other in a time staggered manner. Some valves 130 may be positioned to the known position at the same time as others. However, the effect is that the positioning of the valves 130 to the known position is spread over the delay period.

It is understood that since the energy reserves 352 are discharged, the positioning of the valves 130 to the known position will cause a current draw on the system in order to recharge the energy reserves using power received via the interface 126. That is, once the energy reserve is discharged, the energy reserve immediately begins to draw current to recharge. Once recharged, the energy reserve 352 is ready for normal operation and the valve 130 is in a known position. In one embodiment, the known position is a closed state. Due to the time delays, in the context of the population of irrigation devices 124, the energy reserves 352 will consequently recharge at different times spreading out throughout the recharge period. This is because the delay induced in triggering the positioning of the valves to the known position in a time staggered fashion. Consequently, each of the irrigation devices will recharge their respective stored energy sources at a different period of time, and thus, simultaneously drawing current by all of the irrigation devices is avoided. That is, by spreading out the time for the recharge cycle, the problem described above with large in-rush currents that result in many of the irrigation devices oscillating between charging and discharging the energy reserve to close the valve since during the recharge process, the line voltage drops below a reset level and the irrigation device behaves as if it were initially charging.

In one embodiment, the steps of blocks 610 and 615 may be generally referred to as controllably positioning the irrigation valves 130 of the plurality of irrigation devices 124 after the delay period lapses at each of the plurality of irrigation devices to provide a time staggered positioning of the valves to the known position.

In another embodiment, the controller 322 is configured to provide an exception or bypass to the introduction of the variable delay (blocks 610 and 615) during the manufacturing process. Although generally it is desirable to time stagger the positioning of the valves to the known position when installed in the field, the same feature causes a delay to manufacturing processes. To eliminate manufacturing delays a counter is introduced to skip turn-on valve positioning delays for the first n (e.g. eight) power-up cycles. By skipping turn-on delays for a fixed number of cycles, production can proceed at maximum speed while retaining the feature for end-applications.

Although the foregoing embodiments may be implemented using the exemplary series of operations described herein, additional or fewer operations may be performed. Moreover, it is to be understood that the order of operations shown and described is merely exemplary and that no single order of operation is required. Various embodiments of the present invention have been described, but still further features may alternatively or additionally be implemented in accordance with alternative embodiments of the present invention. While the invention herein disclosed has been described by means of specific embodiments, examples and applications thereof, numerous modifications and variations could be made thereto by those skilled in the art without departing from the scope of the invention set forth in the claims.

What is claimed is:

1. A method for controlling an irrigation device coupled to and receiving operational power from a multi-wire interface of an irrigation control system, the method comprising:
    receiving operational power at the irrigation device as part of an operation during which the irrigation device is one of a plurality of irrigation devices receiving the operational power substantially simultaneously;
    charging an energy reserve of the irrigation device using the operational power, wherein the energy reserve of each of the plurality of irrigation devices is charged and adapted to supply power to an actuator coupled to an irrigation valve;
    identifying a delay period for the irrigation device, wherein the delay period is different than a delay period of at least one other irrigation device of the plurality of irrigation devices, and wherein the delay period defines a period of time that the irrigation device is to delay before the energy reserve is discharged;
    discharging the energy reserve after the delay period lapses; and
    recharging the energy reserve by drawing current from the multi-wire interface to provide a time staggered recharging of the energy reserves of the plurality of the irrigation devices.

2. The method according to claim 1, wherein the identifying of the delay period comprises:
    obtaining an identifier that identifies the irrigation device; and
    determining the delay period based upon at least a portion of the identifier.

3. The method according to claim 2, wherein the identifier uniquely identifies the irrigation device relative to other irrigation devices of the plurality of irrigation devices.

4. The method according to claim 2, wherein the obtaining comprises:
    obtaining the identifier from memory associated with the irrigation device.

5. The method according to claim 2, wherein the identifier uniquely identifies the irrigation device.

6. The method according to claim 1, wherein the actuator comprises a latching solenoid.

7. The method according to claim 1, wherein the identifying of the delay period comprises:
    obtaining an identifier that identifies the irrigation device; and
    determining the delay period based upon at least a portion of the identifier and a delay value.

8. The method according to claim 1, wherein the identifying of the delay period comprises:
    obtaining an identifier that identifies the irrigation device; and
    determining the delay period based upon a number of least significant bits (LSBs) of the identifier.

9. The method according to claim 1, wherein the discharging step comprises discharging the energy reserve while bypassing the delay period for a plurality of times corresponding to performance of the discharging step during manufacturing.

10. The method according to claim 1, wherein the discharging step comprises discharging the energy reserve after the delay period lapses to power the actuator to position the irrigation valve to a known position.

11. The method according to claim 1, wherein the discharging step comprises discharging the energy reserve after the delay period lapses to power the actuator to close the irrigation valve.

12. The method according to claim 1 wherein the plurality of irrigation devices comprises between about 200 and 800 irrigation devices.

13. The method according to claim 1 wherein the energy reserve comprises a capacitor.

14. An irrigation device to be coupled to and receive operational power from a multi-wire interface of an irrigation control system, the irrigation device comprising:
    an actuator configured to control water flow to at least one water delivery device;
    an energy reserve coupled to the actuator and configured to receive and be charged by operational power as part of an operation during which the irrigation device is one of a plurality of irrigation devices receiving and being charged by the operational power substantially simultaneously; and
    a controller configured to:
    identify a delay period for the irrigation device once the energy reserve is charged, wherein the delay period is different than a delay period of at least one other irrigation device of the plurality of irrigation devices, wherein the delay period defines a period of time that the irrigation device is to delay before causing the discharging of the energy reserve;
    cause the energy reserve to be discharged after the delay period lapses, the discharge configured to supply power to the actuator; and
    cause the energy reserve to be recharged by drawing current from the multi-wire interface to provide a time staggered recharging of the energy devices of the plurality of the irrigation devices.

15. The irrigation device according to claim 14, wherein the controller is further configured to cause the energy reserve to be discharged to actuate the actuator to prevent water flow.

16. The irrigation device according to claim 14, wherein the energy reserve comprises a capacitor.

17. The irrigation device according to claim 16, wherein the actuator comprises a solenoid.

18. The irrigation device according to claim 14, wherein the actuator comprises a latching solenoid.

19. The irrigation device according to claim 14, further comprising driver circuits under control of the controller and coupling the energy reserve to the actuator.

20. The irrigation device according to claim 14 wherein the plurality of irrigation devices comprises between about 200 and 800 irrigation devices.

21. The irrigation device according to claim 14, wherein the controller is configured to identify of the delay period by being configured to:
 obtain an identifier that identifies the irrigation device; and
 determine the delay period based upon at least a portion of the identifier.

22. A method for initializing a plurality of irrigation devices each coupled to and receiving operational power from a multi-wire interface of an irrigation control system, the method comprising:
 receiving initial operational power at each of the plurality of irrigation devices substantially simultaneously;
 charging an energy reserve of each of the plurality of irrigation devices using the received operational power, wherein the energy reserve of each of the plurality of irrigation devices is charged and adapted to supply power to a respective actuator coupled to a respective irrigation valve;
 identifying, by a controller at each of the plurality of irrigation devices, a delay period, wherein the delay period is different than a delay period of at least one other of the plurality of irrigation devices, and wherein the delay period defines a period of time that the irrigation device is to delay before the energy reserve is discharged;
 discharging the energy reserve of each of the plurality of irrigation devices after the delay period lapses; and
 recharging the energy reserve of each of the plurality of irrigation devices by drawing current from the multi-wire interface to provide a time staggered recharging of the energy reserves across the plurality of the irrigation devices.

23. A method for initializing a plurality of irrigation devices each coupled to and receiving operational power from a multi-wire interface of an irrigation control system, the method comprising:
 receiving initial operational power at each of the plurality of irrigation devices substantially simultaneously;
 powering up each of the plurality of irrigation devices using the received operational power substantially simultaneously;
 identifying a delay period for each of the plurality of irrigation devices, wherein the delay period for at least one irrigation device is different than the delay period for a least another irrigation device;
 controllably discharging and recharging an energy reserve of each of the plurality of irrigation devices after the delay period lapses at each of the plurality of irrigation devices to provide a time staggered recharging of the energy reserves across the plurality of the irrigation devices.

24. A method for use in controlling an irrigation device coupled to and receiving power from a multi-wire interface of an irrigation control system, the method comprising:
 receiving the power at the irrigation device from the multi-wire interface as part of an operation during which the irrigation device is one of a plurality of irrigation devices receiving the power from the multi-wire interface substantially simultaneously;
 powering up a controller of the irrigation device using the power; and
 outputting a control signal, after a delay period, to position an irrigation valve coupled to the irrigation device to a known position, as part of an operation during which irrigation valves coupled to the plurality of irrigation devices are also positioned to the known position after a respective delay period, wherein the delay period is different than the respective delay period of at least one other of the plurality of irrigation devices, such that the positioning of the irrigation valves of the plurality of irrigation devices is staggered in time.

25. The method according to claim 24 further comprising:
 positioning the irrigation valve to the known position using an energy reserve of the irrigation device.

26. The method according to claim 25 wherein the energy reserve comprises a capacitor.

27. The method according to claim 25 further comprising:
 charging, prior to the outputting step, the energy reserve of the irrigation device using the power, wherein the energy reserve of each of the plurality of irrigation devices is charged.

28. The method according to claim 27 wherein the outputting the signal step comprises outputting the control signal after the delay period, the method further comprising:
 discharging, responsive to the control signal, the energy reserve to position the irrigation valve to the known position.

29. The method according to claim 28 wherein the discharging the energy reserve step comprises:
 directing discharged energy from the energy reserve to an actuator coupled to the irrigation valve.

30. The method according to claim 29 wherein the actuator comprises a latching solenoid.

31. The method according to claim 28 further comprising:
 recharging, after the discharging step, the energy reserve by drawing current from the multi-wire interface, as part of an operation during which the energy reserves of the plurality of irrigation devices are also recharged to provide a time staggered recharging of the energy reserves of the plurality of the irrigation devices.

32. The method according to claim 24 further comprising:
 identifying the delay period for the irrigation device.

33. The method according to claim 32, wherein the identifying step comprises:
 obtaining an identifier that identifies the irrigation device; and
 determining the delay period based upon at least a portion of the identifier.

34. The method according to claim 33, wherein the identifier uniquely identifies the irrigation device relative to others of the plurality of irrigation devices.

35. The method according to claim 33, wherein the obtaining comprises:
 obtaining the identifier from memory associated with the irrigation device.

36. The method according to claim 33, wherein the identifier uniquely identifies the irrigation device.

37. The method according to claim 32, wherein the identifying step comprises:
 obtaining an identifier that identifies the irrigation device; and
 determining the delay period based upon at least a portion of the identifier and a delay value.

38. The method according to claim 32, wherein the identifying step comprises:
- obtaining an identifier that identifies the irrigation device; and
- determining the delay period based upon a number of least significant bits (LSBs) of the identifier.

39. The method according to claim 24 wherein the plurality of irrigation devices comprises between about 200 and 800 irrigation devices.

* * * * *